Oct. 15, 1929.  W. G. BAYHA ET AL  1,731,520
GAUGE
Filed June 7, 1927

INVENTORS
William G. Bayha
James I. Hellerman, Sr.
Josef Schall
By Charles Merrick their ATTORNEY Patented Oct. 15, 1929

1,731,520

UNITED STATES PATENT OFFICE

WILLIAM G. BAYHA, OF PERKASIE, JAMES I. HELLERMAN, SR., OF ALMONT, AND JOSEF SCHALL, OF SELLERSVILLE, PENNSYLVANIA, ASSIGNORS TO UNITED STATES GAUGE COMPANY, OF NEW YORK, N. Y., A CORPORATION OF PENNSYLVANIA

GAUGE

Application filed June 7, 1927. Serial No. 197,052.

Our invention relates to gauges such as are used to indicate the pressure of fluids, and specifically fluids confined under pressure such as air in pneumatic automobile tires.

The broad object of our invention is to provide effective yet inexpensive means to decrease the liability of gauges to injury from rough handling or shock, such as being accidentally dropped on the ground, and to accomplish this object in such a manner as to avoid or to substantially avoid impairing the accuracy of such gauges.

The specific object of our invention is to cheaply incorporate shock absorbers in the particular type of Bourdon tube gauge, designed for quickly testing the pressure in automobile tires and known to the trade as a "tire tester".

Referring to the accompanying drawings in which an embodiment of the preferred construction is shown:—

The numeral 1 indicates the case of a tire tester.

Within the case 1 a conventional socket casting 3 is shown secured to case 1 by means of screws 5—5 tapped into said casting 3 and having their heads 7—7 outside case 1.

Figure 4:
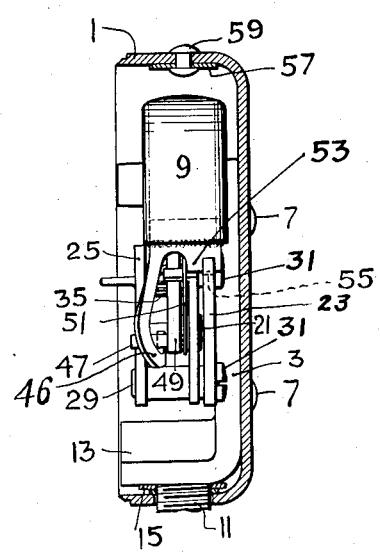
Fig. 4 is a section taken on the line 4—4 of Fig. 1, looking in the direction of the arrows.

Into the casting 3 is soldered a conventional Bourdon tube 9 which is open thereinto and a conventional downwardly extending passage within the threaded portion 11 of casting 3 communicates with Bourdon tube 9. Threaded portion 11 extends through a hole in the case 1, as best shown in Fig. 4.

Figure 1:
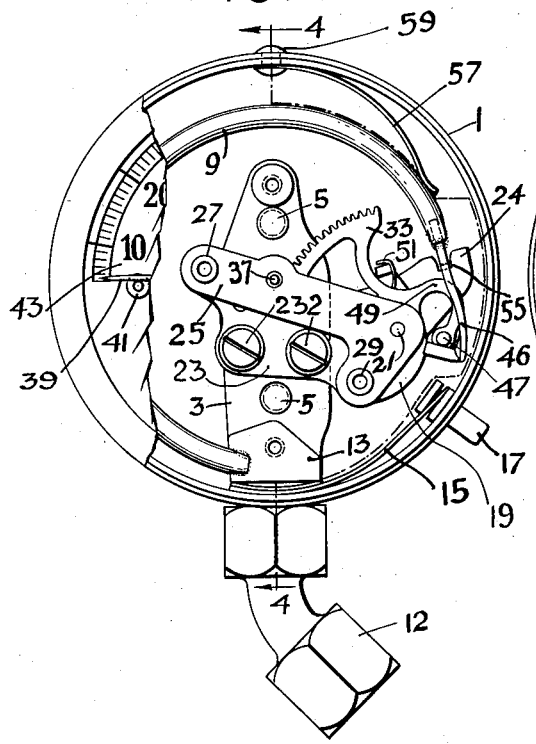
Fig. 1 is a front elevation of a tire tester gauge with the conventional crystal bezel and dial partly broken away to show the operating mechanism.
Figure 2:
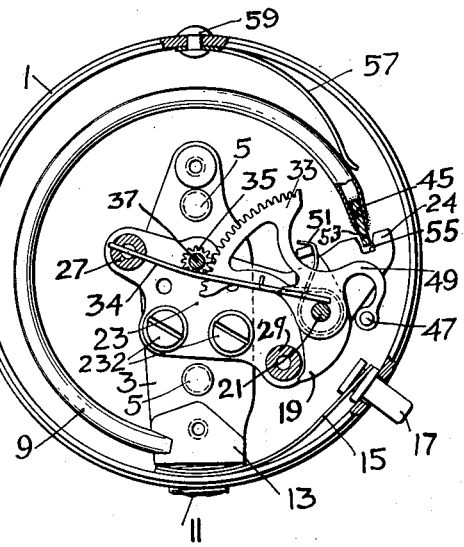
Fig. 2 is generally similar to Fig. 1, but some of the mechanism in the foreground of Fig. 1 has been omitted to show the remaining mechanism more clearly.
Figure 3:
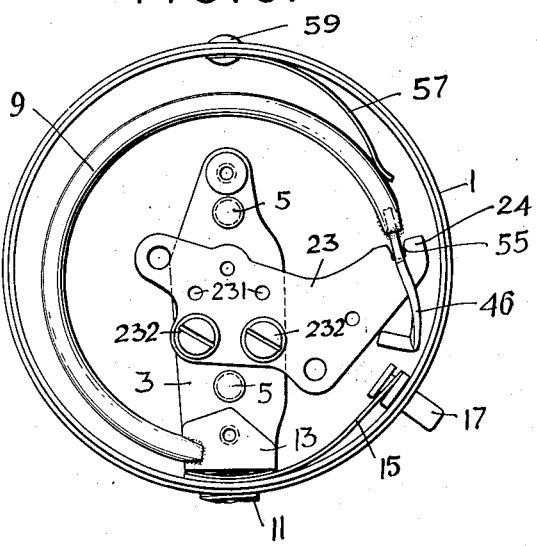
Fig. 3 is generally similar to Fig. 2 but some of the mechanism in the foreground of Fig. 2 has been omitted to show the remaining mechanism more clearly.

The threaded portion 11 is provided with a conventional fitting 12, shown in Fig. 1.

Secured beneath a shoulder 13 of casting 3 there is a conventional spring 15 engaging and outwardly thrusting a push button 17. Push button 17 is designed to be thrust inwardly by the finger or thumb of an operator and engage a conventional member 19 journaled on a conventional shaft 21 which is journaled in the plates 23 and 25.

Plate 23 is provided with centering lugs 231—231 and secured to casting 3 by screws 232—232 tapped into said casting 3. Plate 23 is conventional except for the forked end portion 24 and plate 25 is conventional and is supported from plate 23 by tubular members 27 and 29 riveted in plate 25 and which are secured to plate 23 by screws 31—31. The forked end portion 24 is unconventional and provides a new and improved function, to be more fully described hereafter, without any increased manufacturing cost except for a small amount of additional raw material.

Shaft 21 is immovably attached to the conventional segmental gear 33 which meshes with pinion 35 which is immovably attached to a shaft 37 which is journalled in plates 23 and 25 and carries at its forward extension a conventional pointer 39 the end of which appears in Fig. 1 resting against the stop 41 which is mounted on the dial 43.

Bourdon tube 9 is provided with an end piece 45 soldered thereinto and having a conventional hook portion 46 to actuate the stud 47 which is carried by an extension 49 of gear 33. This gauge is known as of the manual reset type and when the push button 17 is thrust in by an operator, member 19 acting through conventional spring 51 rotates gear 33 in a clockwise direction and through it gear 35 in a counter clockwise direction and causes pointer 39 to move in said latter direction until it abuts stop 41.

Thereafter spring 51 may give slightly, if pressure on the push button 17 is continued, thus preventing straining of the parts.

When the pressure in the Bourdon tube 9 is increased during the testing of a tire in a conventional manner by means of this gauge, the hook 46 lifts the stud 47, rotates the gear 33 in a counter clockwise direction, which rotates pinion 35 in a clockwise direction and causes an indication to be made by pointer 39. After the indication is read by the operator the pointer 39 may be restored to the indicated zero position by push button 17, as previously described. When a sudden increase of pressure occurs in the Bourdon tube 9 the momentum imparted to gear 33 is damped by a conventional friction spring 34 bearing on shaft 21 and secured in the member 27. This prevents the pointer 39 registering a false high indication.

Bourdon tubes are easily collapsed beyond their elastic limit when a gauge is roughly handled or dropped and when thus bent the calibration and accuracy of such gauges is impaired. Bourdon tubes are particularly liable to be bent at the point where the tube is soldered to the socket and in our improved gauge we have reduced the liability to damage by the several instrumentalities to be described hereafter, and with a minimum of added manufacturing cost.

The end piece 45 is provided with an extension 53, which, when the gauge is at rest, enters the slot 55 of forked extension 24 of plate 23 in the indicated manner, thus preventing any accidental shock particularly shocks from the direction of two or three o'clock to eight or nine o'clock, bending the free end of the Bourdon tube 9.

In order to additionally stabilize and secure the Bourdon tube 9 when subjected to shock, we provide a tension spring 57 secured to the case 1 by a rivet 59 and bearing at its free end upon Bourdon tube 9. Spring 57 keeps the extension 53 from jumping out of the slot 55 when a shock comes from any radial direction with respect to shaft 37 and the cross-sectional shape of a Bourdon tube such as our Bourdon tube 9 causes shocks from the direction of the axis of the shaft 37 to be effectively resisted so that additional shock absorbing means are unessential.

We claim:

1. A tire tester provided with a case and a socket casting secured therein, a frame for operating mechanism mounted on the casting, a Bourdon tube mounted on the casting, an end piece at the free end of the Bourdon tube including an operating hook and a stabilizing extension, a relatively rigid forked member to receive the stabilizing extension and a tension spring mounted on the case so as to bear at its free end on the Bourdon tube and prevent the stabilizing extension jarring out of the forked extension when the tire tester is subjected to shock.

2. A tire tester provided with a case and a socket casting secured therein, a frame for operating mechanism mounted on the casting, a Bourdon tube mounted on the casting, an end piece at the free end of the Bourdon tube including an operating element and a stabilizing extension and a relatively rigid forked member on the frame to receive the stabilizing extension.

WILLIAM G. BAYHA.
JAMES I. HELLERMAN, Sr.
JOSEF SCHALL.